United States Patent
Klavans et al.

(10) Patent No.: US 7,254,530 B2
(45) Date of Patent: Aug. 7, 2007

(54) SYSTEM AND METHOD OF GENERATING DICTIONARY ENTRIES

(75) Inventors: Judith L. Klavans, Hastiangs-on-Hudson, NY (US); Smaranda Muresan, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 775 days.

(21) Appl. No.: 10/398,535

(22) PCT Filed: Sep. 26, 2002

(86) PCT No.: PCT/US02/30675

§ 371 (c)(1),
(2), (4) Date: Oct. 24, 2003

(87) PCT Pub. No.: WO03/027894

PCT Pub. Date: Apr. 3, 2003

(65) Prior Publication Data

US 2005/0234709 A1    Oct. 20, 2005

Related U.S. Application Data

(60) Provisional application No. 60/324,880, filed on Sep. 27, 2001.

(51) Int. Cl.
*G06F 17/27* (2006.01)
*G06F 17/21* (2006.01)

(52) U.S. Cl. .......................... 704/10; 704/9
(58) Field of Classification Search .............. 704/10; 706/55

See application file for complete search history.

(56) References Cited

U.S. PATENT DOCUMENTS

| 4,967,368 A | * | 10/1990 | Bolling et al. ............... 706/52 |
| 5,056,021 A | * | 10/1991 | Ausborn ...................... 704/9 |
| 5,365,434 A | * | 11/1994 | Figliuzzi ................... 715/501.1 |
| 5,383,120 A | * | 1/1995 | Zernik ......................... 704/10 |

(Continued)

OTHER PUBLICATIONS

Riloff et al, "A Corpus-Baed Approach for Building Semantic Lexicons", In Proceedings of the Second Conference on Empirical Methods in Natural Language Processing, EMNLP-2, 1997.*

(Continued)

*Primary Examiner*—Tālivaldis Ivars Šmits
*Assistant Examiner*—Dorothy S Siedler
(74) *Attorney, Agent, or Firm*—Baker Botts LLP

(57) ABSTRACT

A system for automatically generating a dictionary from full text articles extracts <term, definition> pairs from full text articles and stores the <term, definition> pairs as dictionary entries. The system includes a computer readable corpus having a plurality of documents therein. A pattern processing module (120) and a grammar processing module (125) are provided for extracting <term, definition> pairs from the corpus and storing the <term, definition> pairs in a dictionary database (145). A routing processing module selectively routes sentences in the corpus to at least one of the pattern processing module or grammar processing module. In one embodiment, the routing module is incorporated into the pattern processing module which then selectively routes a portion of the sentences to the grammar processing module. A bootstrapping processing module (150) can be used to apply <term, definition> entries against the corpus to identify and extract additional <terms, definition> entries.

22 Claims, 13 Drawing Sheets

U.S. PATENT DOCUMENTS

| | | | | |
|---|---|---|---|---|
| 5,642,518 | A | * | 6/1997 | Kiyama et al. ................. 704/7 |
| 5,652,898 | A | * | 7/1997 | Kaji ............................ 704/10 |
| 5,799,268 | A | * | 8/1998 | Boguraev ...................... 704/9 |
| 6,108,620 | A | * | 8/2000 | Richardson et al. ........... 704/9 |
| 6,120,297 | A | * | 9/2000 | Morse et al. ............... 434/169 |
| 6,718,317 | B1 | * | 4/2004 | Wang et al. ................... 706/50 |
| 7,136,876 | B1 | * | 11/2006 | Adar et al. .............. 707/104.1 |

OTHER PUBLICATIONS

Pichon et al, "Automatic Acquisition of Meaning Elements for the Creation of Semantic Lexicons", Information Society, IS-98, 1998, pp. 69-72.*

Bourigault, "Surface Grammatical Analysis for the Extraction of Terminological Noun Phrases", Internatioanl Conference on Computational Linguistics, Proceedings of the 14th Conference on Computational Linguistics, vol. 3, 1992, pp. 977-981.*

Riloff, "Automatically Contructiong a Dictionary for Infromation Extraction Tasks", Proceedings of the 11th National Conference on Artificial Inteligence, 1993, pp. 811-816.*

Park et al, "Hybrid text mining for finding abbreviations and their definitions", Proceedings of the 2001 Conference on Empirical Methods in Natural Language Processing, Jun. 2001, pp. 126-133.*

Daile, "Study and Implementation of Combined Techniques for Automatic Extraction of Terminology", In Balancing Act: Combining Symbolic and Statistical Approaches to Language. Workshop at the 32an annual meeting of the Association for Computational Linguistics, 1994, pp. 29-36.*

Hearst, "Automatic Acquisition of hyponyms from Large Text Corpora", International Conference on Computational Linguistics, 1992, vol. 2, Nantes, France, pp. 539-545.*

Taghva et al, "Recognizing acronyms and their definitions", International Journal on Document Analysis and Recognition, vol. 4, May 1999, pp. 191-198.*

* cited by examiner

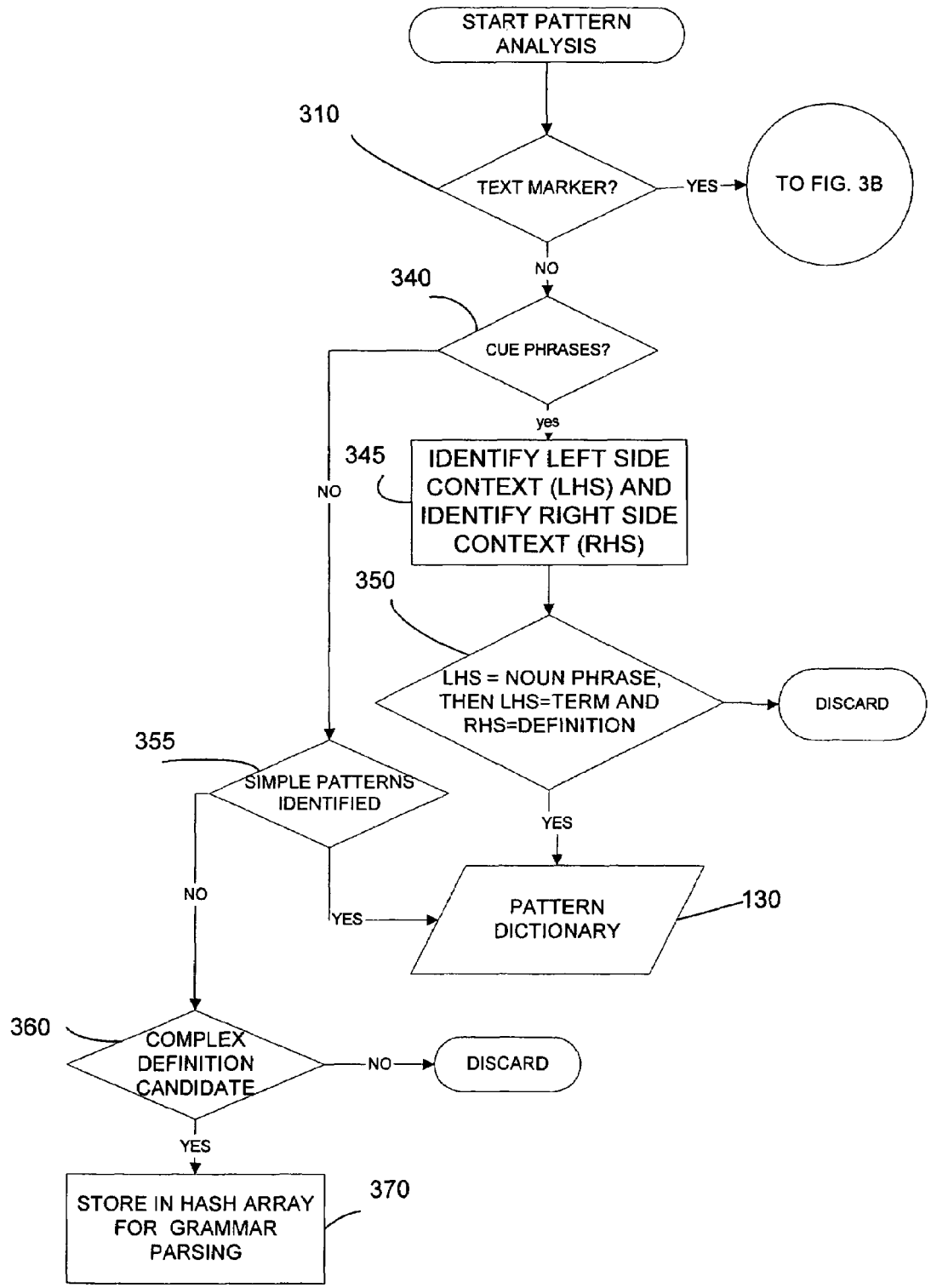

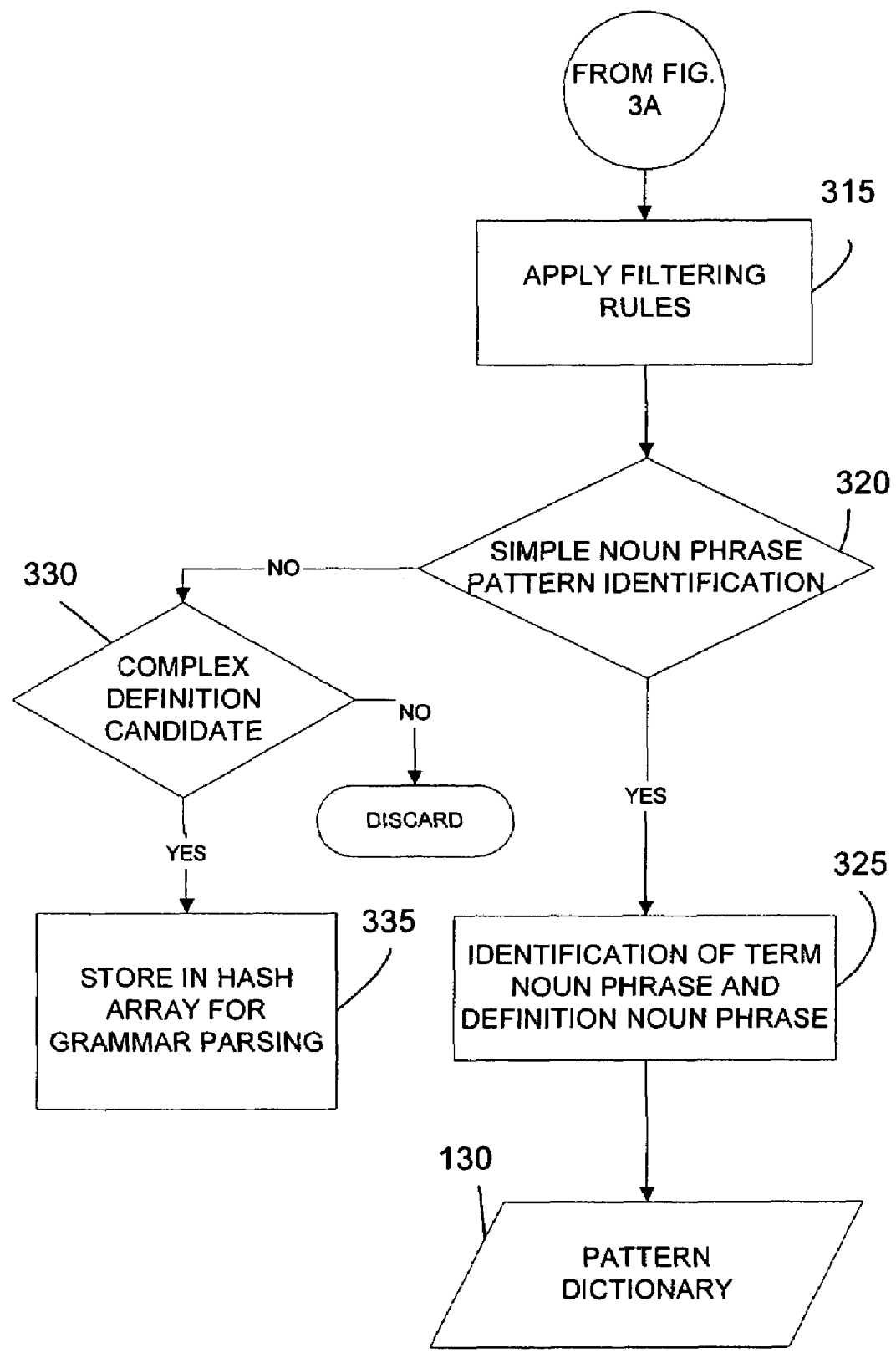

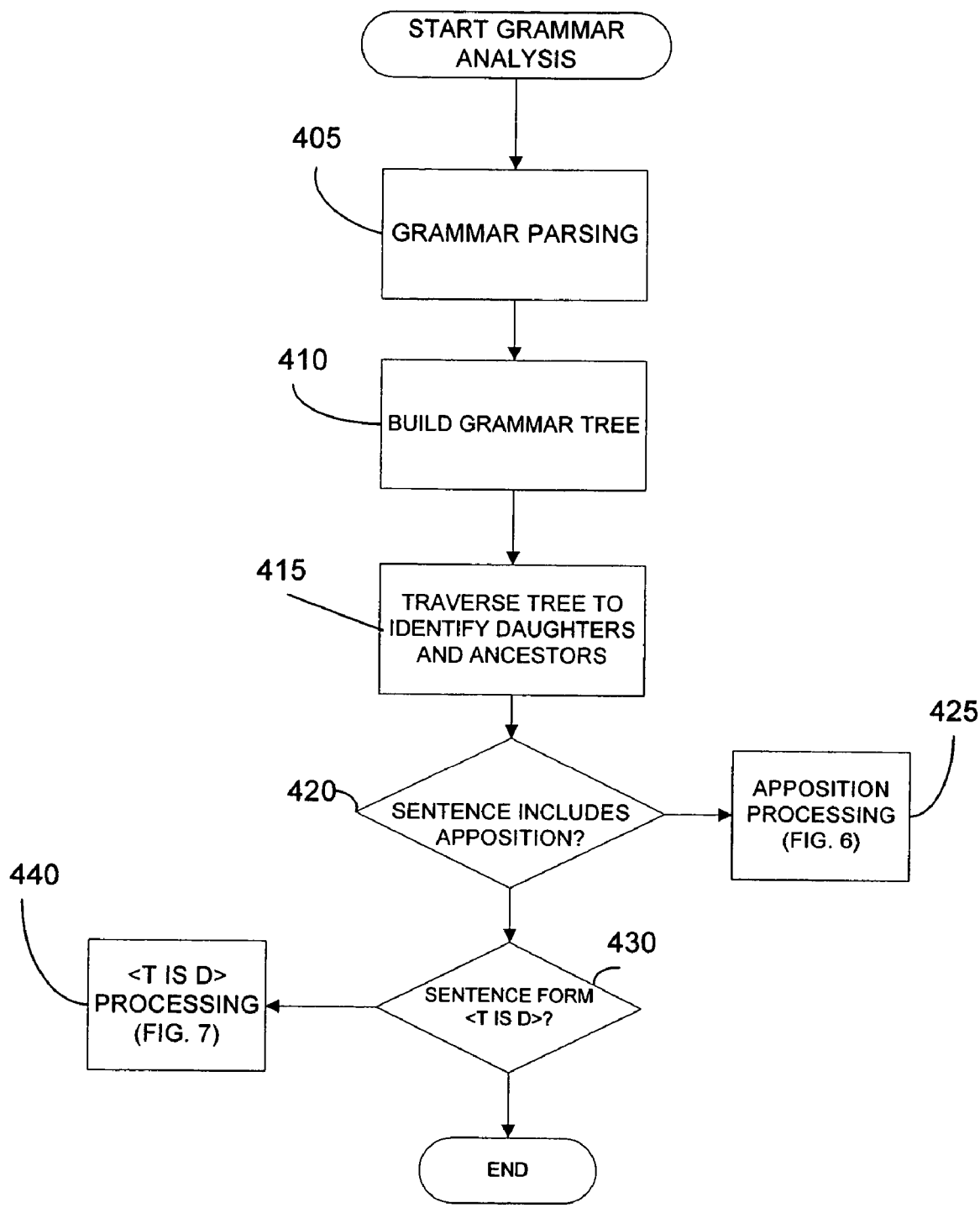

FIG. 5A

Sentence 1: Angina, the pressing chest pain most people associate with heart problems, is not a reliable indicator.

| | | |
|---|---|---|
| lconj | angina1nf(1) | noun cn sg |
| subj(n) | ,(101) | noun cn sg |
| ndet | the1(2) | det sg indef, possdet def |
| nadj | pressing1(3) | adj |
| mnoun | chest1(4) | noun cn sg |
| nconj | pain1(5) | noun cn sg |
| ndet | most3(6) | det sg/pl indef |
| subj(n) | people1(7) | noun cn pl |
| nucla | associate2(8,7,a,9) | verb vfin vpres pl vsubj |
| comp(p) | with1(9,11) | prep |
| mnoun | heart1(10) | noun cn sg |
| obj|prep(n) | problem1(11,a,a) | noun cn pl |
| top | be(12,10l,16) | verb vfin vpres sg vsubj |
| vadv | not1(13) | adv |
| ndet | a(14) | det sg Omdef |
| nadj | reliable1(15,a) | adj |
| pred(n) | indicator1(16,a) | noun cn sg |

Example: Ischemia is a condition in which blood flow is cut off or restricted from a particular area.

```
Charniak's parser output:
(S1 (S (NP (NNP Ischemia))
    (VP (AUX is)
     (NP (NP (DT a) (NN condition))
      (SBAR (WHPP (IN in) (WHNP (WDT which)))
       (S (NP (NN blood) (NN flow))
        (VP (AUX is)
         (VP (VP (VBN cut) (PRT (RP off)))
          (CC or)
          (VP (VBN restricted)
           (PP (IN from) (NP (DT a) (JJ particular) (NN area)))))))))))
   (. .)))
```

SYSTEM AND METHOD OF GENERATING DICTIONARY ENTRIES

RELATED APPLICATIONS

The present application claims the benefit of U.S. Provisional Application Ser. No. 60/324,880, entitled "Method for Identifying Definitions and their Technical Terms from on-line Text for Automatically Building a Glossary of Terms," filed on Sep. 27, 2001, the disclosure of which is hereby incorporated by reference in its entirety.

FIELD OF THE INVENTION

The present invention relates generally to language processing and more particularly relates to a method for automatically generating dictionary entries using text analysis.

BACKGROUND OF THE INVENTION

The internet has enjoyed tremendous growth over recent years. As a result, vast quantities of information are readily available to millions of users. Among the vast content available on the internet are technical papers, which are of interest to a large number of people, but may be written for a technical audience and assume a baseline understanding of terms used in the particular field. Since now, more than ever, this assumption is not necessarily true, the importance of on-line dictionaries of technical terms is of growing importance.

On-line dictionaries of technical terms have been difficult to build and are often lacking in completeness. For example, technical dictionaries such as the Online Medical Dictionary (OMD, http://www.graylab.ac.uk/omd/index.html), are often missing common terms which are assumed to be understood by those practicing in the particular field. In addition, the definitions in such dictionaries are often too technical for use by a lay person. Accordingly, it would be desirable to automatically generate on-line glossaries of technical terms that are comprehensive and generally useful to the technically oriented user as well as the lay person.

SUMMARY OF THE INVENTION

It is an object of the present invention to provide a system for automatically generating dictionaries based on an analysis of full text articles.

It is an object of the present invention to provide a system for automatically generating dictionaries for various technical domains based on an analysis of fall text articles.

It is a further object of the present invention to provide a system and method for extracting term-definition pairs from full text articles, the term-definition pairs being capable of use as dictionary entries.

In accordance with the invention, a computer-based method for automatically generating a dictionary based on a corpus of fall text articles is provided. The method applies linguistic pattern analysis to the sentences in the corpus to extract simple <term, definition> pairs and identify sentences with candidate complex <term, definition> pairs. Grammar analysis is then applied to the sentences with candidate complex <term, definition> pairs to extract <term, definition> pairs. The extracted <term, definition> pairs are then stored in a dictionary database.

Pattern analysis can include identifying sentences having text markers and predetermined cue phrases and subjecting the identified sentences to rule based <term, definition> extraction. Sentences which include text markers can be further processed by a filtering operation to remove sentences which are not indicative of having <term, definition> pairs. Grammar processing generally operates upon sentences which include apposition or are in the form term is definition.

Also in accordance with the present invention is a system for automatically generating a dictionary from full text articles. The system includes a computer readable corpus having a plurality of documents therein. A pattern processing module and a grammar processing module for extracting <term, definition> pairs from the corpus and storing the <term, definition> pairs in a dictionary database are also provided. A routing processing module is provided to selectively route sentences in the corpus to at least one of the pattern processing module and grammar processing module.

Preferably, the system further includes a bootstrap processing module. The bootstrap processing module applies entries in the dictionary database to the corpus and extracts and stores additional <term, definition> pairs in the dictionary database.

In one embodiment, the routing processing module tags sentences which may include <term, definition> pairs and routes all tagged sentences to the pattern processing module. In addition to extracting certain <term, definition> pairs, the pattern processing module performs the additional operation of identifying sentences which include candidate complex <term, definition> pairs. The grammar processing module then receives the sentences having candidate complex <term, definition> pairs from the pattern processing module and operates to extract <term, definition> pairs from these sentences.

BRIEF DESCRIPTION OF THE DRAWING

Further objects, features and advantages of the invention will become apparent from the following detailed description taken in conjunction with the accompanying figures showing illustrative embodiments of the invention, in which:

FIGS. 3A and 3B are a flow chart illustrating the pattern analysis processing operation of FIG. 1 in greater detail;

FIG. 4 is a is a flow chart illustrating the grammar analysis processing operation of FIG. 1 in greater detail;

FIG. 5A is a pictorial representation of an example of a parse tree output from a grammar parsing program, such as English Slot Grammar;

FIG. 5B is a pictorial representation of an example of a parse tree output from a statistical grammar parsing program, such as Charniak's statistical parser;

Figure 1:
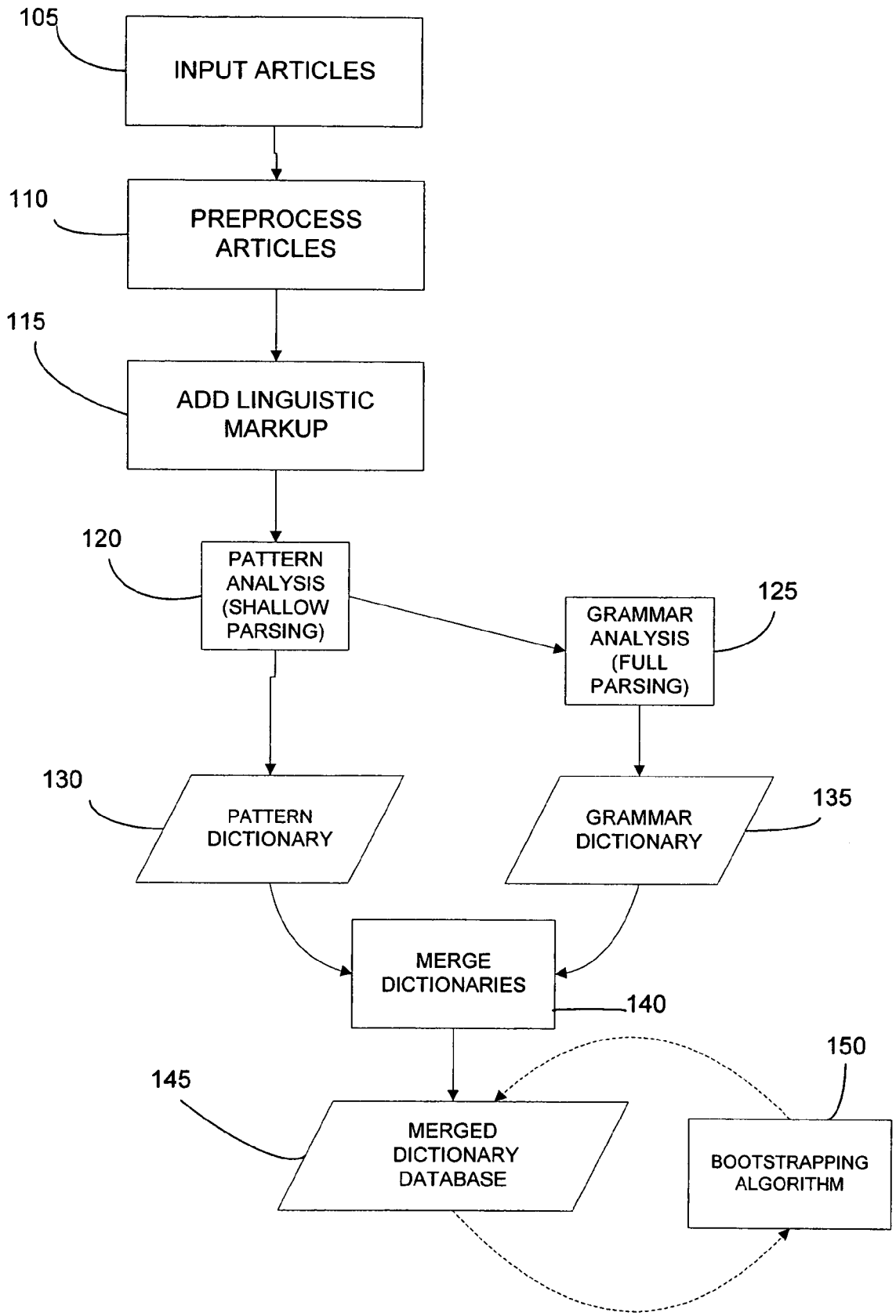
FIG. 1 is a flow diagram illustrating the overall operation of a system for generating entries for a dictionary by extracting term-definition pairs from full text articles.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

FIG. 1 is a flow diagram illustrating the overall operation of a first embodiment of a system for generating entries for a dictionary by extracting <term, definition> pairs or tuples, from full text articles. While the system and methods of FIG. 1 will be described using the example of the medical field, the present invention can be applied to any body of text from which a user wishes to build a computer readable dictionary. The method of FIG. 1 is generally performed on a conventional computer system, which is operatively coupled to a source of full text articles. The articles can be stored in a local database or can be accessed over a digital communications network, such as the internet.

In step 105, the articles, in computer readable form, such as ASCII, HTML and the like, are input to the system. The articles are passed to a preprocessing algorithm, which tokenizes the input articles and formats the articles in a manner which is suitable for processing by text parser and part-of-speech tagging algorithms. The preprocessing operations of step 110 can include stripping away HTML tags, tokenizing the text and rewriting the text file as one sentence per line with each line numbered and identified to its source text. Tokenizing the text generally includes separating, by a space, each unit of a sentence (word, punctuation, number) that can be considered an independent token. Generally, hyphenated words are maintained as a single token.

Following preprocessing, an Add Linguistic Markup operation is performed which is used to identify sentences which may include <term, definition> tuples (step 115). The operation of the Add Linguistic Markup operation of step 115 is further illustrated in FIG. 2.

Figure 2:
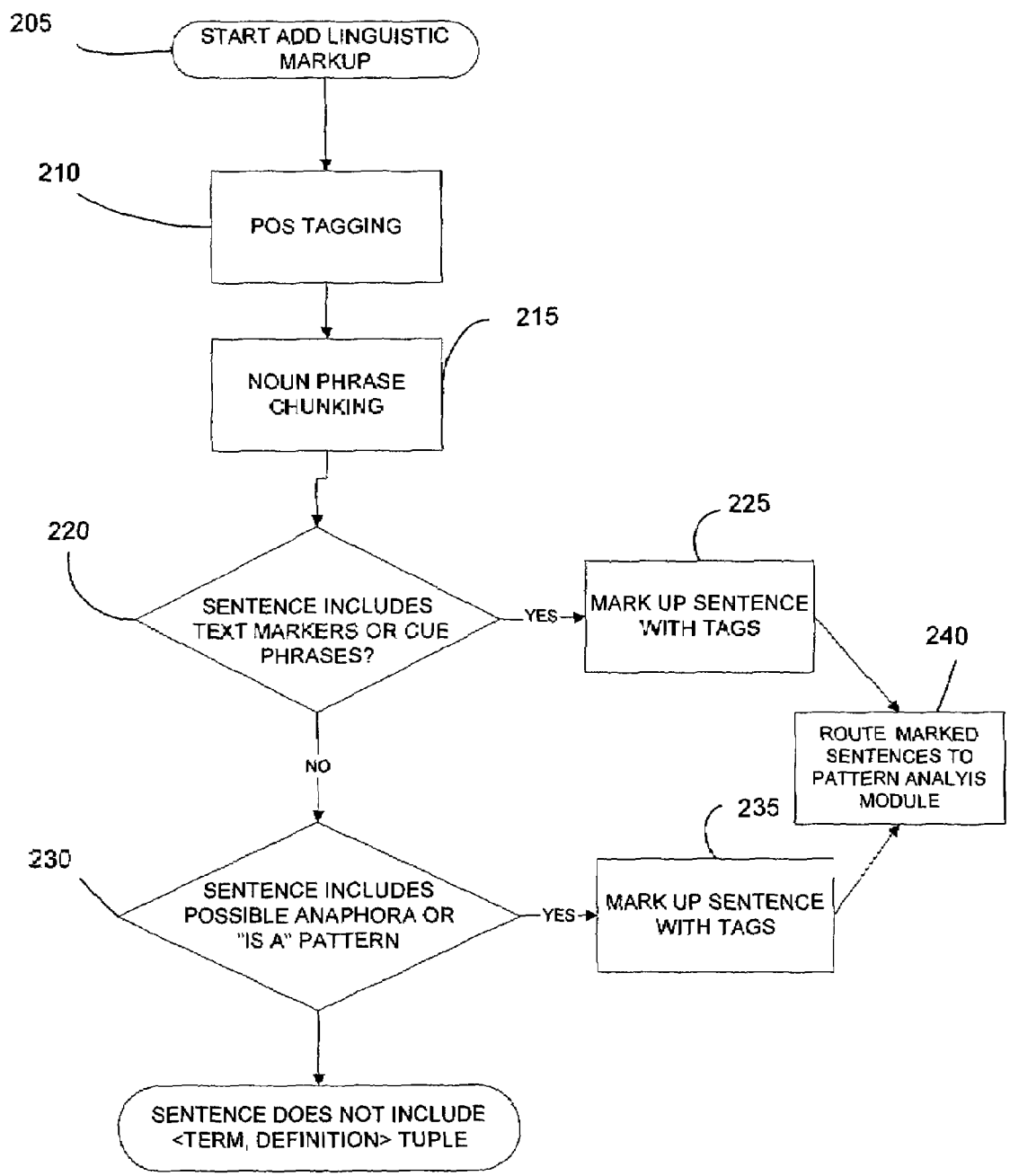
FIG. 2 is a flow chart further illustrating the operation of an add linguistic markup block of FIG. 1.

Referring to FIG. 2, adding linguistic mark ups begins by applying part-of-speech (POS) tagging to assign a part of speech label to each word (step 210). A number of known POS tagging programs can be used in connection with step 210. One suitable POS tagging program is described by E. Brill, "A Simple Rule-based Part of Speech Tagger," Proceedings of the Third Conference on Applied Natural Language Processing, Trento, Italy, 1992, the disclosure of which is hereby incorporated by reference in its entirety.

Following POS tagging, a noun phrase identification operation, referred to in the art as Noun Phrase Chunking, is applied in step 215 to identify various forms of noun phrases in the sentences being processed. A suitable method for performing Noun Phrase Chunking is described by Ramshaw and Marcus in "Text Chunking Using Transformation-Based Learning," Proceedings of Third ACL Workshop on Very Large Corpora," MIT, 1995, the disclosure of which is hereby incorporated by reference in its entirety. The Noun Phrase Chunking algorithm identifies noun phrases in the sentences being analyzed and sets the noun phrases apart from the other text, such as by insertion of brackets. For example, the sentence "Arrhythmia—irregular heartbeat—is experienced by millions of people in a variety of forms." will be tagged as follows:

[Arrhythmia/NNP]--/: [irregular/JJ heartbeat/NN]--/: is/VBZ experienced/VBN by/IN [millions/NNS] of/IN [people/NNS] in/IN [a/DT variety/NN] of/IN forms/NNS;

where NNP represents a proper noun, JJ represents an adjective, NN represents common noun, VBZ is verb, present tense, singular, VBN is verb, past participles, IN means preposition, DT refers to determiner and NNS refers to common noun, plural.

After Noun Phrase Chunking, the input sentences are evaluated to determine whether they include either text markers or cue phrases (Step 220). Text markers that have been found to be indicative of a definition include hyphens, such as --, and parenthetical expressions following noun phrases. Cue phrases which are indicative of a definition include forms of "X is the term used to describe Y," as opposed to phrases such as "for example" or "such as" which tend to indicate explanation rather than definition. Those sentences which are found to include cue phrases and/or text markers in step 220 are marked with tags in step 225. In step 240, the sentences marked in step 225 are routed to a pattern analysis module 120 which performs shallow parsing of the sentence to extract simple <term, definition> tuples and also identifies candidate sentences which may include complex definitions.

If in step 220 the sentence being evaluated does not include text markers, the sentence is further evaluated to determine whether the sentence includes possible anaphora or represents a form of term is definition (step 230). Such sentences are marked with tags indicating the possible <term, definition> tuple in step 235 and the marked sentences are routed to the pattern analysis module (Step 240). If the test performed in step 230 fails, the sentence is rejected as not including a <term, definition> tuple.

The sentences that are marked in steps 225 and 235 are passed to the pattern analysis module which is further described in connection with FIGS. 3A and 3B. In step 310, the sentences are evaluated for the presence of text markers. Those sentences which include text markers are then subjected to a number of filtering rules in step 315 (FIG. 3B) which are designed to eliminate sentences which are not likely to possess <term, definition> tuples. The filtering rules generally will remove sentences which have conjunctions at the beginning of a text marker. In addition, the filtering rules will identify and remove phrases that indicate explanation rather than definition, such as "for example," "for instance" and the like. The filtering rules can also identify and eliminate sentences having lists of commas and conjunctions, which indicate enumeration and have not been found to identify <term, definition> pairs. It will be appreciated that additional rules may be found to be useful in identifying and eliminating phrases set off by text markers which are not indicative of term-definition pairs and that such rules could also be implemented in step 315.

Following the filtering operations of step 315, the remaining sentences including text markers are analyzed to identify simple noun phrase patterns in the form: Noun Phrase 1 {text marker} Noun Phrase 2 (step 320). For those sentences which include such noun phrase patterns, which represent a <term, definition> pair, the term and definition need to be identified in step 325. One method of identifying the term and definition components of the <term, definition> tuple is to determine the frequency of occurrence of Noun Phrase 1 and Noun Phrase 2. The noun phrase having the higher frequency of occurrence is designated the term and the other noun phrase is considered the definition for the term (step 325). The <term, definition> tuples can be used to form a hash array where the terms are keys to the array and the definitions are the values of the array. The hash array is then added to the pattern dictionary database 130.

If in step 320, the sentence does not represent a simple noun phrase pattern, the sentence is further evaluated to determine whether the sentence may include a complex definition and be a candidate for further grammar processing (step 330). Sentences of various forms having syntactic structures more complex than Noun Phrase 1 {text marker} Noun Phrase 2 can be candidates for complex definitions. For example sentences having a form Noun Phrase 1 {text marker} Noun Phrase 2 (.*), where (.*) represents any additional text, can be identified a candidates which may include complex definitions. Sentences which include possible complex definitions are stored in a hash array for subsequent grammar processing which will be described below in connection with FIG. 4 (step 335). If in step 330, the sentences do not include candidates for complex definitions, the sentences are removed from further processing.

Returning to FIG. 3A, in step 310, those sentences which do not include text markers are passed to step 340 which evaluates the input sentences to identify cue phrases within the sentences. A non-exhaustive list of cue phrases includes: "is the term used to describe", "is defined as", "is called" and the like. Sentences including cue phrases are parsed by identifying the context on the left hand side (LHS) of the cue phrase and the context on the right hand side (RHS) of the cue phrase (step 345). If the left hand side is a noun phrase, then the LHS noun phrase will be considered a term and the right hand side will be considered a definition for the term (step 350). The <term, definition> pair can be used to generate a hash array and added to the pattern dictionary database 130

Those sentences which do not include cue phrases in step 340 are further evaluated to determine if they include simple patterns which have been found to be representative of simple <term, definition> tuples (step 355). Such simple patterns include {Noun Phrase is Noun Phrase} and {Noun Phrase, or (optional) Noun Phrase, |}. For example, "myocardial infarction, heart attack . . . " and "myocardial infarction, or heart attack . . . " illustrate such patterns. <Term, definition> tuples are extracted from sentences having the simple patterns tested for in step 355 and the extracted <term, definition> tuples are added to the pattern dictionary 130.

Those sentences in step 355 which do not include simple patterns are further analyzed to determine if the sentences may include complex definitions (step 360). As in the case of sentences having text markers, sentences of various forms having syntactic structures more complex than Noun Phrase 1 is Noun Phrase 2 can be candidates for complex definitions. If a sentence is identified as including a candidate complex definition, the sentence is added to a hash table and is stored for additional processing (step 370). Otherwise, the sentence is discarded from additional processing.

Returning to FIG. 1, the sentences that are placed in the hash array as including candidates for complex definitions are passed from the pattern analysis processing block 120 to the grammar analysis processing block 125 to determine if this subset of sentences include <term, definition> tuples. The operation of the grammar analysis block 125 is further illustrated in the flow diagram of FIG. 4.

Referring to FIG. 4, grammar analysis processing begins with a grammar parsing operation (step 405). Grammar parsing can be performed with known parsing programs such as the English Slot Grammar (ESG) parser program, available from International Business Machines and described in "The Slot Grammar System," by McCord, IBM Research Report, 1991, or a statistical parser, such as that described by E. Charniak in "A Maximum Entropy Inspired Parser," Proceedings of NAACL 2002, the disclosure of which is hereby incorporated by reference. These parser programs are used to parse each input file and obtain a parsed form for each sentence (step 405). For each sentence, the ASCII-style output which is generally provided by the parser program is formatted as a parsed data structure that provides the dependency between the words in the sentences, the hash array that contains the feature structures associated with each word, which are the nodes in the tree, and the slot filler type of each node (step 410).

A typical parsed tree structure based on the ESG parser is illustrated, for example, in FIG. 5A. In FIG. 5A, the first column 505 indicates the slot filled by the node (word), the second column 510 lists the words and positions of the words, the third column 520 lists the feature structure for each word. FIG. 5B illustrates an example of parsed output using Charniak's statistical parser.

Returning to FIG. 4, the parsed tree is traversed to determine the daughters and ancestors of each node (step 415). The sentences are then evaluated to determine if they include apposition (step 420) and if they do, processing is passed to apposition processing logic in step 425. If in step 420 the sentences do not include apposition, the sentences are evaluated to determine if the sentences are of the form term is definition (<T is D>). For sentences in the form of <T is D>, <T is D> processing block 435 is called to identify and extract term-definition pairs.

Figure 6:
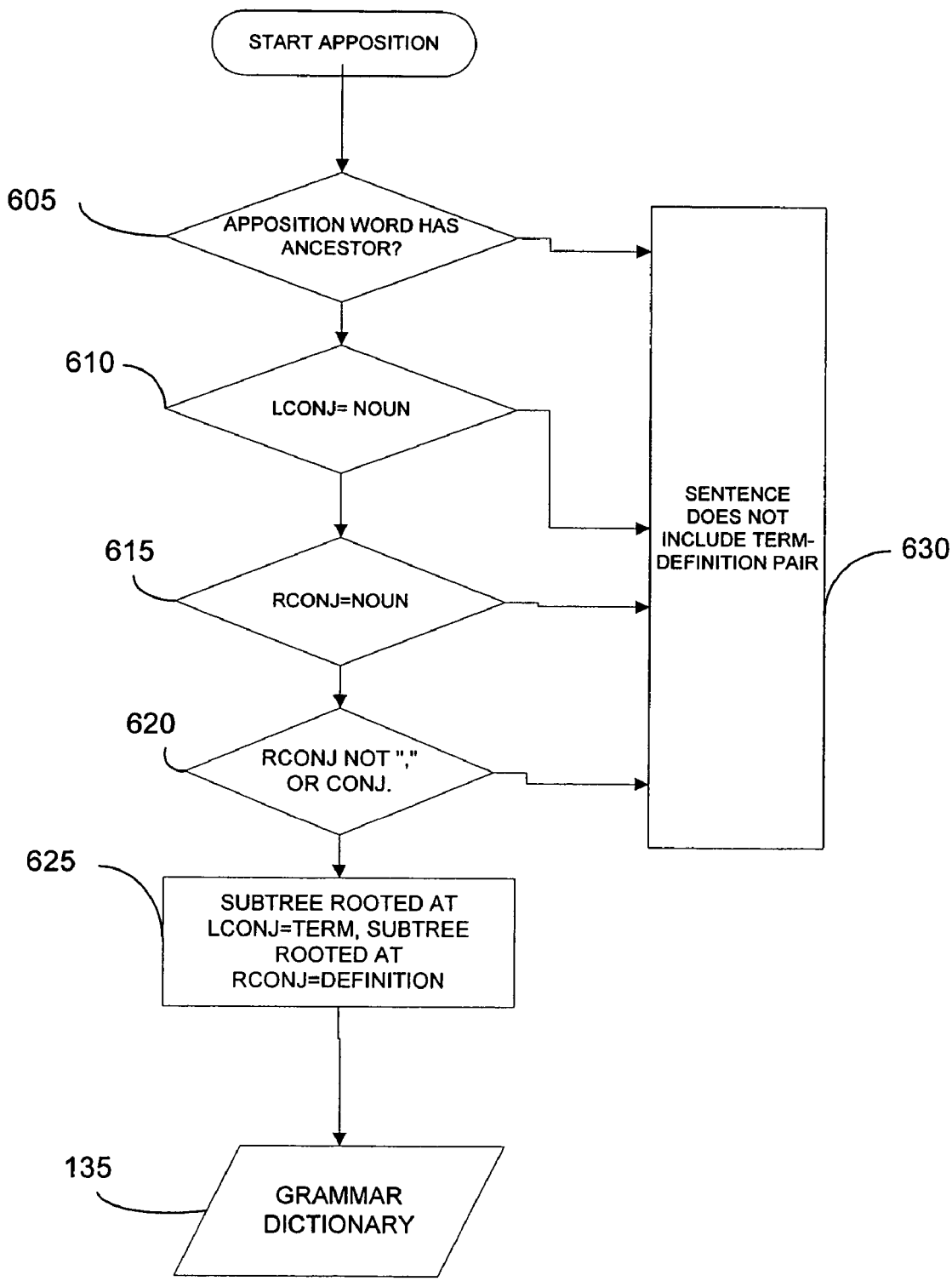
FIG. 6 is a simplified flow chart illustrating an exemplary apposition processing subroutine suitable for use in connection with grammar analysis processing.

FIG. 6 is a flow chart illustrating an example of logic which can be used to process sentences including apposition in order to extract <term, definition> pairs. In step 605 the tree structure is evaluated to determine whether the apposition word (',' '--' '(', ) has ancestors. If so, then the left conjunction (lconj) is identified and evaluated to determine if the lconj is a noun (step 610). Similarly, the right conjunction (rconj) is evaluated to determine if it is a noun (step 615). The right conjunction is also tested to determine whether it includes an additional comma or conjunction, which would be indicative of enumeration rather than definition (step 620). If the lconj=noun, rconj=noun and rconj does not indicate enumeration, the subtree rooted at lconj is labeled as the term, the subtree rooted at rconj is labeled as the definition and the term-definition pair is added to the hash tree (step 625) as an entry for the grammar dictionary (135). If any of the decision blocks 605, 610, 615 or 620 fail, the sentence is considered as not including a <term, definition> tuple (block 630).

Figure 7:
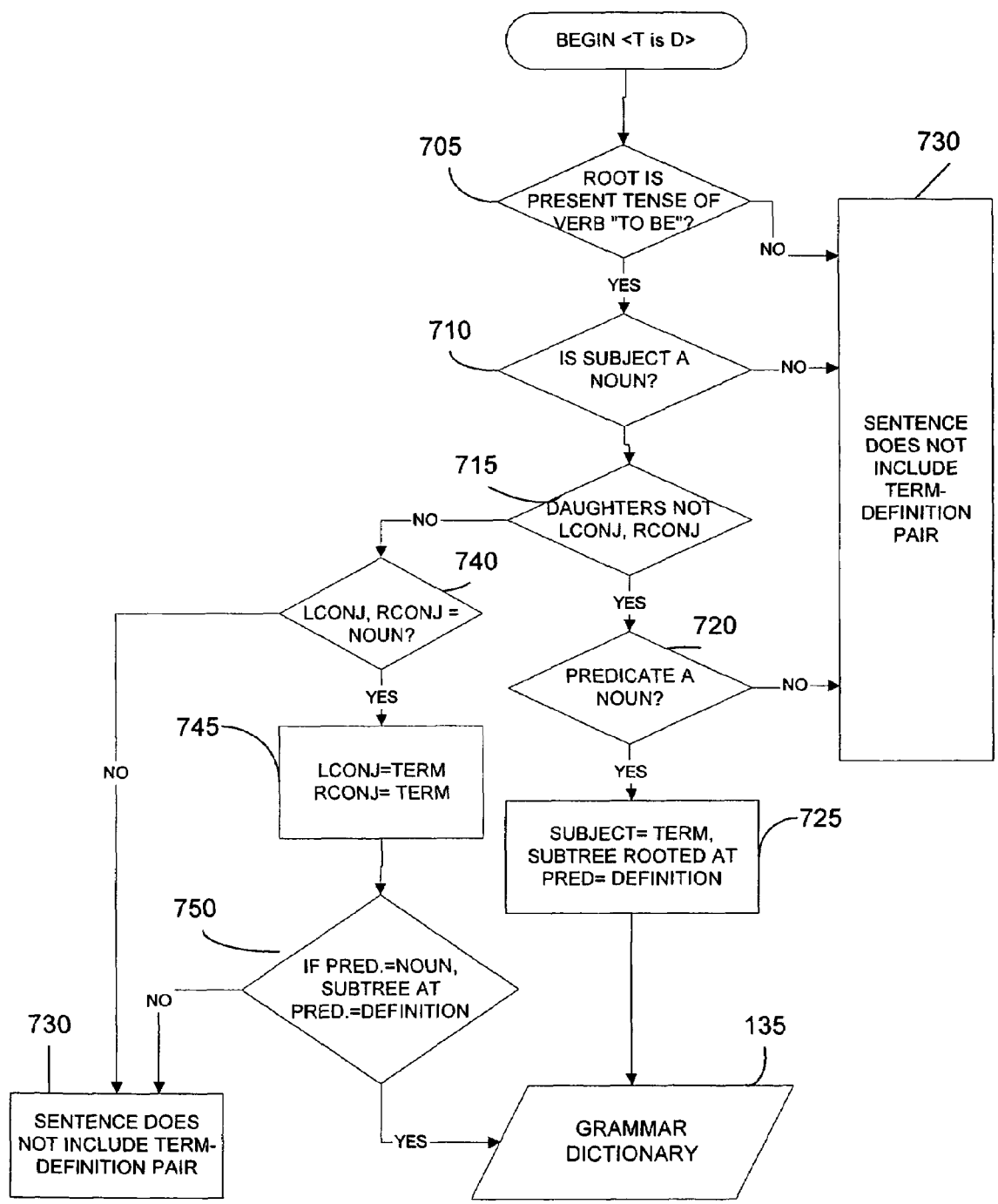
FIG. 7 is a simplified flow chart illustrating a subroutine for extracting <term, definition> tuples from sentences in the form TERM is DEFINITION, which is suitable for use in connection with grammar analysis processing.

FIG. 7 is a flow chart illustrating an example of logic which can be used to process sentences in the form term is definition, <T is D>, to extract <term, definition> pairs. In step 705, the parsed tree of the sentence is evaluated to determine if the root of the tree is a present tense form of the verb "to be." If so, then in step 710 the subject of the sentence is evaluated to determine if the subject is a noun. If the subject is noun, then flow proceeds to step 715 where the daughters of the subject are evaluated to determine whether the daughters are left conjunctions (lconj) and right conjunctions (rconj). If in step 715 the daughters are not lconj, rconj, then the predicate in the sentence is tested in step 720 to determine if the predicate is a noun. If the predicate is a noun, then the subject is identified as the term and the subtree rooted at the predicate is identified as the definition (step 725). The <term, definition> pair is then added to the hash table in the grammar dictionary 135.

Returning to step 715, if the daughters of the subject are in the form lconj, rconj, than the lconj and rconj terms are evaluated to determine if they are nouns, which indicates that these daughters are possible synonyms of the subject. If the lconj and rconj are nouns, then each of these daughters is labeled as additional terms (step 745). The predicate of the sentence is then tested to determine if it is a noun in step 750. If the predicate is a noun, than the subtree rooted at the predicate is labeled as the definition for each of the terms. The <term, definition> pairs are then added to the hash array which are then entered into the grammar dictionary 135. If any of the conditional tests of steps 705, 710, 720, 740, or 750 fail, then the sentence is considered as not including a term-definition pair.

Figure 8:
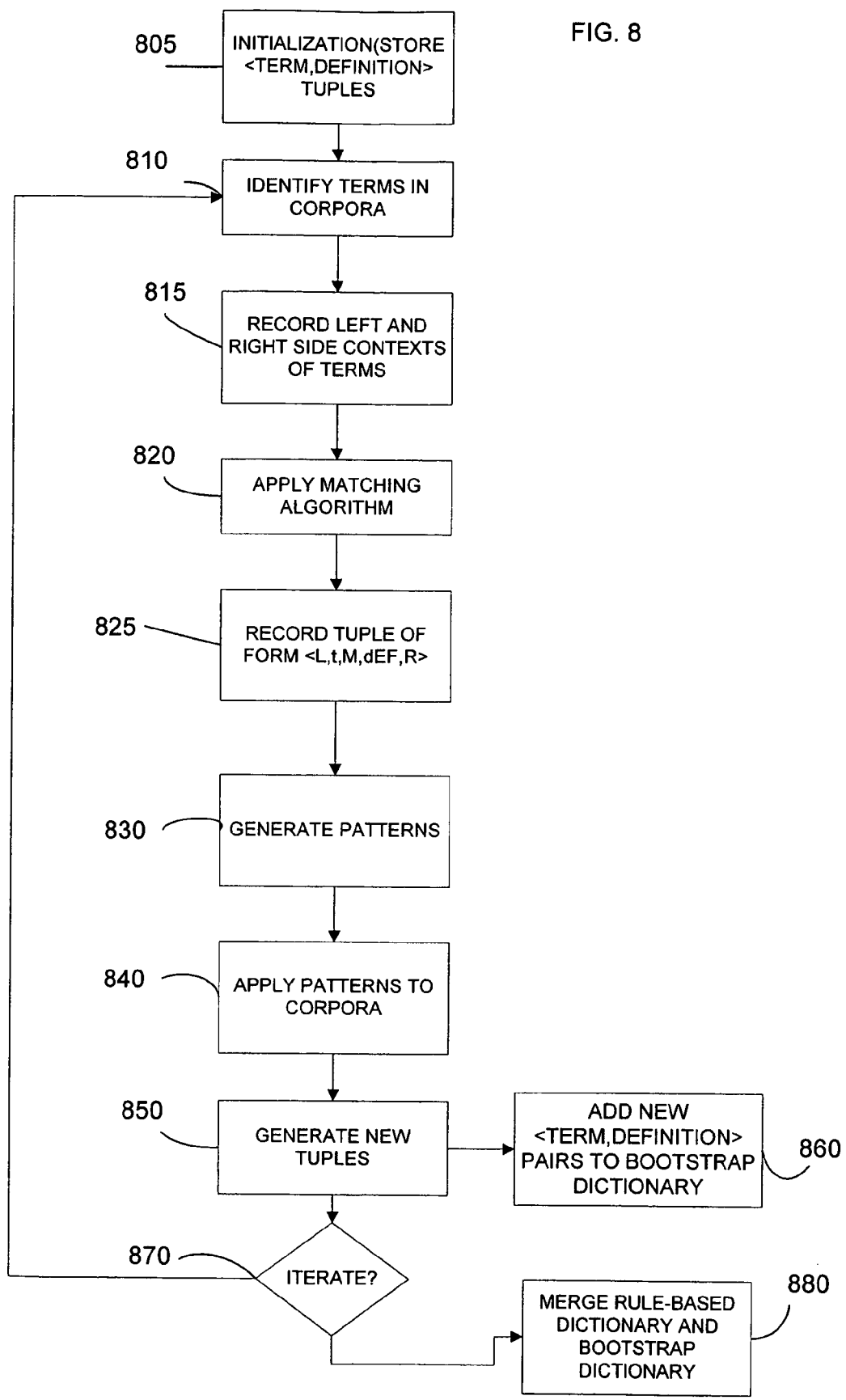
FIG. 8 is a simplified flow chart further illustrating the steps performed by a bootstrapping algorithm, which is suitable for use in expanding the rule based dictionary database.

Referring to FIG. 1, the merged dictionary database 145 can be further expanded with additional <term, definition> pairs by applying a bootstrapping algorithm in step 150, such as is described in further detail in FIG. 8.

Referring to FIG. 8, the <term, definition> pairs of the merged dictionary database 145 are used as seed tuples in the initialization step (step 805). Then, the terms are identified in the corpora of full text articles (step 810) and the left hand side context and right hand side context of each term is identified inside the sentence where the term is identified (step 815). A matching algorithm is then used to identify correspondence between the definition and the left hand side and right hand side context, respectively (step 820). To increase flexibility, word order is not considered by the algorithm. When a definition is subsumed by either the left side or ride side context or overlaps either context sufficiently, the context is considered as a match to the definition and the exact match is called Def.

After matching is performed a new tuple of the form <l,T,m,Def,r> is recorded that keeps the left(l), the middle (m) and the right(r) context inside the sentence (step 825). These contexts are in connection with both term and definition. An example of middle context is: (<term> is characterized by <definition>). It has been observed that the middle context can be more important than right or left contexts. Thus it may be preferable to assigned more weight to m.

The sentence from the corpus that contains the <term, definition> pair is parsed using a statistical parser, such as that described by E. Charniak in "A Maximum Entropy Inspired Parser," Proceedings of NAACL 2002, the disclosure of which is hereby incorporated by reference. The statistical parser can be used to generate candidate patterns for identifying additional <term, definition> tuples in the corpus in the following iterative steps.

Candidate patterns are identified from the parse tree (step 830) by performing a matching algorithm on the parse tree of the sentences from the corpus and the initial tuple <term, definition> parse tree. The subtrees are matched to a corresponding T and Def and the tree pattern covering these two subtrees is recorded.

A best rank score can then be used to select new patterns which identify <term, definition> tuples in the corpora. The rank score is similar to a RlogF measure used in AutoSlog-TS, by E. Riloff in the paper. "Automatically generating Extraction Patterns from Untagged Text", Proceeding of AAAI 1996. The rank score is computed as: score(patern) =,R*log$_2$(F), where F is the number of unique good tuples <term, definition> the pattern extracts, N is the total number of tuples (good and bad) and R=F/N. A pattern can extract both <term, definition> pairs as well as <term, n-n-definition> pairs. The first is considered a good tuple. The latter form, which is not a true <term, definition> pair is considered a bad tuple.

Examples of new patterns extracted using bootstrapping are set forth in the table below.

| Examples of Patterns Identified by Bootstrapping Algorithm |
| --- |
| <term> is characterized by <definition> |
| <term>, in which <definition> |
| <term> - in which <definition> |
| <term>, which is <definition> |
| <term> is used to <definition> |
| <term> occurs when <definition> |
| In <term>, <definition> |

After new patterns are identified, they are applied to the corpus of full text articles (step 840) and new <term, definition> tuples are identified (step 850). These tuples are added to the temporary bootstrap dictionary (step 860) and then additional iterations can be performed a fixed number of times, such as three times, or until less than a predetermined number of new tuples is identified (step 870).

After the iteration process ends, the original dictionary is then merged with the boot strapping dictionary to produce the final output dictionary (step 880).

Figure 9:
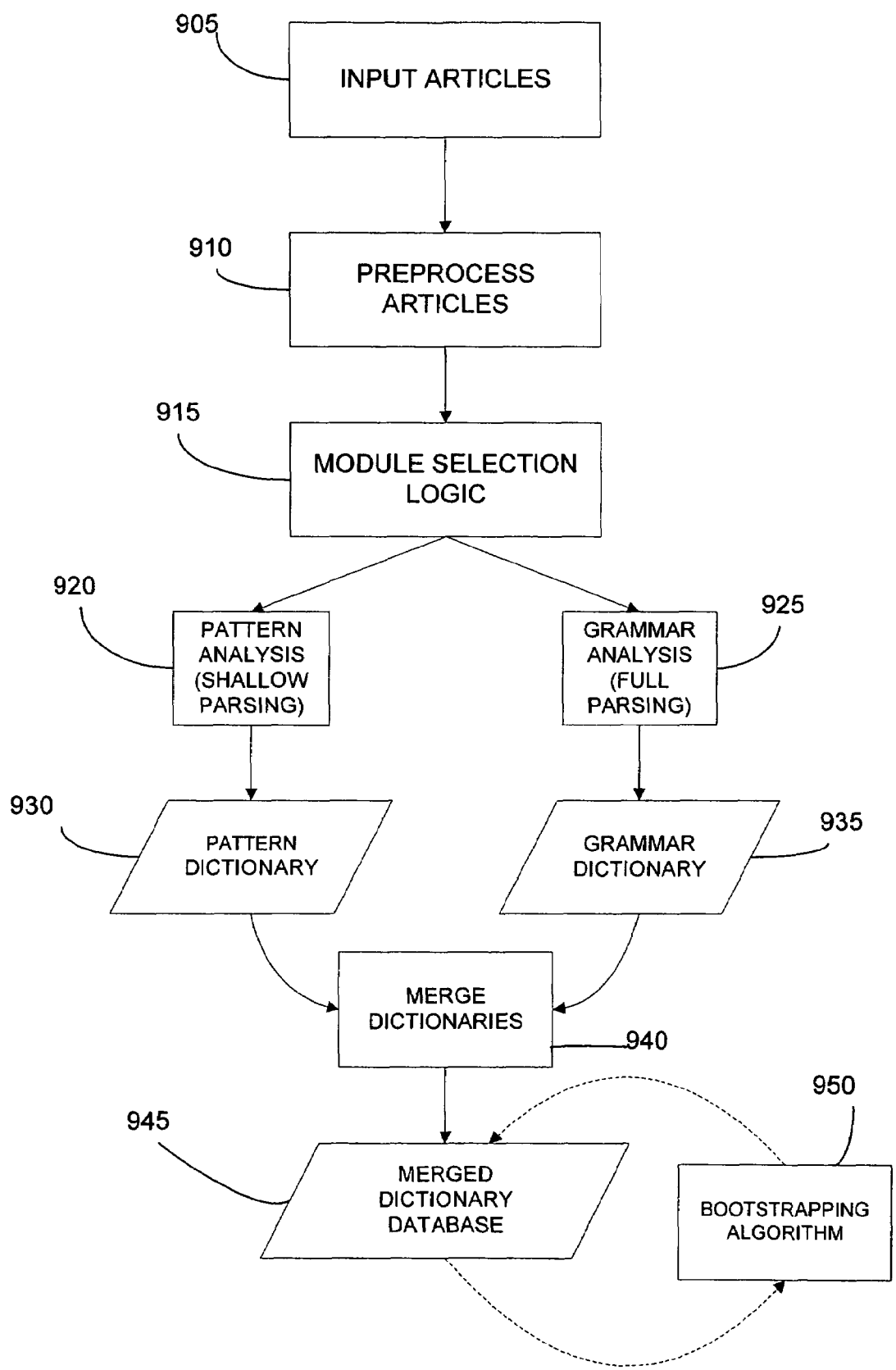
FIG. 9 is a flow diagram illustrating the overall operation of an alternate embodiment of a system for generating entries for a dictionary by extracting <term, definition> pairs from a corpus of full text articles.
Figure 10:
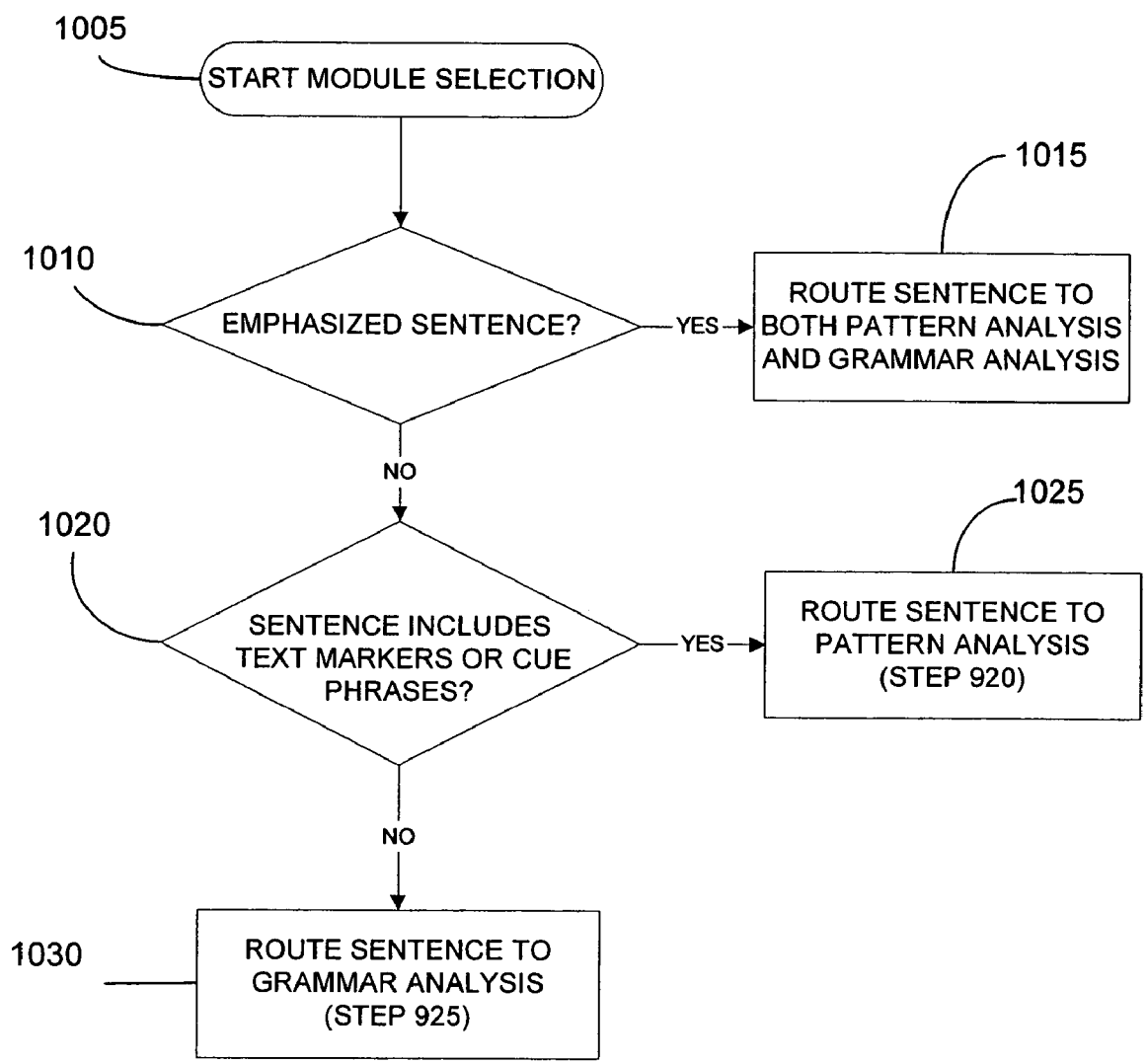
FIG. 10 is a flow chart further illustrating the operation of a module selection logic block of FIG. 9.
Figure 11:
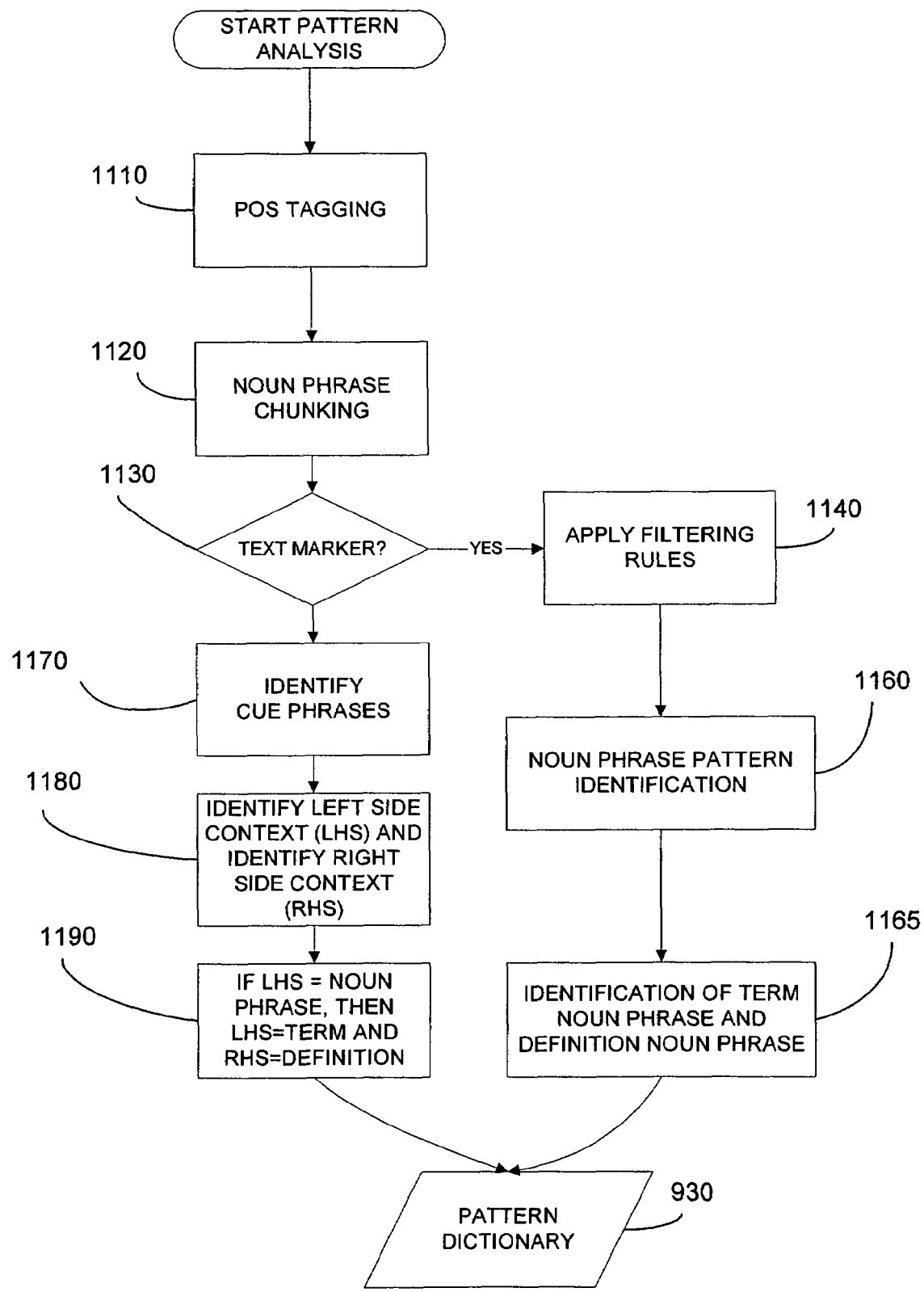
FIG. 11 is a flow chart illustrating the pattern analysis processing operation of FIG. 9 in greater detail.

An alternate embodiment of the present systems and methods for extracting <term, definition> pairs from full text sources is illustrated in FIGS. 9 through 11. The system of FIG. 9 is similar to the architecture depicted in FIG. 1 except that instead of routing all sentences through the shallow parsing block 120 of FIG. 1, a module selection logic block 915 is used to route the sentences to either one or both of a pattern analysis 910 and/or a grammar analysis processing block 925. Thus the embodiment of FIG. 9 replaces the linguistic mark-up block 915 with the module selection logic block 915 and modifications to the shallow parsing block are also provided to account for this change.

Except as noted below, processing blocks 905, 910, 925, 930, 935, 940, 945 and 950 are substantially the same as processing blocks 105, 110, 125, 130, 135, 140, 145 and 150, respectively, which are described above in connection with FIG. 1.

In step 905, the articles, in computer readable form, such as ASCII, HTML and the like, are input to the system. The articles are passed to a preprocessing algorithm 910, which tokenizes the input articles and formats the articles in a manner which is suitable for processing by text parser and part-of-speech tagging algorithms. The preprocessing operations of step 910 can include stripping away HTML tags other than those which are emphasis tags, such as <EM> and <B>, tokenizing the text and rewriting the text file as one sentence per line with each line numbered and identified to its source text. Tokenizing the text generally includes separating, by a space, each unit of a sentence (word, punctuation, number) that can be considered an independent token. Generally, hyphenated words are kept as a single token Following preprocessing of step 910, the system performs a module selection operation in module selection logic block

915. The module selection block analyzes the input articles to route the text to either a pattern analysis processing block 920, a grammar analysis processing block 925 or both processing blocks. The pattern analysis processing block 920 extracts term-definition pairs from the sentences routed to this processing block by the module selection logic 915 and places the term-definition pairs in a pattern dictionary database 930. The operation of the pattern analysis processing block 920 is further described below in connection with FIG. 10.

Referring to FIG. 10, the operation of the module selection logic block 915 is further described. In the module selection logic, the input sentences are evaluated to determine if they are emphasized sentences (step 1010). In the case of HTML formatted files, emphasized sentences are identified by the presence of emphasis tags, such as <EM> and <B>. Those sentences which are identified as emphasized are passed to both the pattern analysis processing block 920 and the grammar analysis processing block 925 in step 1015 to extract <term, definition> tuples.

Those sentences from the input articles which are not emphasized sentences are further evaluated to determine whether the sentences include text markers which are indicative of the presence of a definition or cue phrases which are indicative of the presence of a definition (step 1020). Text markers that have been found to be indicative of a definition include hyphens, such as --, and parenthetical expressions following noun phrases. Cue phrases which are indicative of a definition include forms of "X is the term used to describe Y," as opposed to phrases such as "for example" or "such as" which tend to indicate explanation rather than definition. Those sentences which are found to include cue phrases and/or text markers are passed to the pattern analysis block 920 in step 1025 which performs shallow parsing of the sentence to extract simple <term, definition> tuples.

Those sentences which do not include text markers or cue phrases in step 1020 are passed to the grammar analysis block 925 for full parsing and grammar analysis (step 1030).

FIG. 11 is a simplified flow chart illustrating an embodiment of the logical flow used in the pattern analysis (shallow parsing) block 920. For each file that is passed to the pattern analysis processing block, part-of-speech (POS) tagging is applied to assign a part of speech label to each word (step 1110). A number of known POS tagging programs can be used in connection with step 1110. One suitable POS tagging program is described by E. Brill, "A Simple Rule-based Part of Speech Tagger," Proceedings of the Third Conference on Applied Natural Language Processing, Trento, Italy, 1992, the disclosure of which is hereby incorporated by reference in its entirety.

Following POS tagging, a noun phrase identification operation, referred to in the art as Noun Phrase Chunking, is applied in step 1120 to identify various forms of noun phrases in the sentences being processed. A suitable method for performing Noun Phrase Chunking is described by Ramshaw and Marcus in "Text Chunking Using Transformation-Based Learning," Proceedings of Third ACL Workshop on Very Large Corpora," MIT, 1995, the disclosure of which is hereby incorporated by reference in its entirety. The Noun Phrase Chunking algorithm identifies noun phrases in the sentences being analyzed and sets the noun phrases apart from the other text, such as by insertion of brackets. For example, the sentence "Arrhythmia—irregular heartbeat—is experienced by millions of people in a variety of forms." will be tagged as follows:

[Arrhythmia/NNP]--/: [irregular/JJ heartbeat/NN]--/: is/VBZ experienced/VBN by/IN [millions/NNS] of/IN [people/NNS] in/IN [a/DT variety/NN] of/IN forms/NNS;

where NNP represents a proper noun, JJ represents an adjective, NN represents common noun, VBZ is verb, present tense, singular, VBN is verb, past participles, IN means preposition, DT refers to determiner and NNS refers to common noun, plural.

Following the Noun Phrase Chunking operation of step 1120, for each sentence that contain text markers in step 1130, a set of filtering rules will be applied in step 1140 to remove sentences that include misleading patterns which have been found are not indicative of term-definition pairs. The filtering rules generally will remove sentences which have conjunctions at the beginning of a text marker. In addition, the filtering rules will identify and remove phrases that indicate explanation rather than definition, such as "for example," "for instance" and the like. The filtering rules can also identify and eliminate sentences that have a series of commas and conjunctions, which indicate enumeration and have not been found to identify term-definition pairs. It will be appreciated that additional rules may be found to be useful in identifying and eliminating phrases set off by text markers which are not indicative of term-definition pairs and that such rules could also be implemented in step 1140.

Following the filtering operations of step 1140, the remaining sentences including text markers are analyzed to identify noun phrase patterns in the form: Noun Phrase 1 {text marker} Noun Phrase 2 {text marker or.} (step 1160). In this pattern, either Noun Phrase 1 or Noun Phrase 2 may be either the term or definition. To identify the term and definition, for each such noun phrase pattern which represents a term-definition pair, the frequency of occurrence of Noun Phrase 1 and Noun Phrase 2 are determined. The noun phrase having the higher frequency of occurrence is designated the term and the other noun phrase is considered the definition for the term (step 1165). The <term, definition> tuples can be used to form a hash array where the terms are keys to the array and the definitions are the values of the array. The hash array is then added to the pattern dictionary database 930.

Returning to step 1130, those sentences which do not include text markers are passed to step 1170 which evaluates the input sentences to identify cue phrases within the sentences. A non-exhaustive list of cue phrases includes: "is the term used to describe", "is defined as", "is called" and the like. The sentence is then parsed by identifying the context on the left hand side (LHS) of the cue phrase and the context on the right hand side (RHS) of the cue phrase (step 1180). If the left hand side is a noun phrase, then the noun phrase will be considered a term and the right hand side will be considered a definition for the term (step 1190). The <ten, definition> pair can be added to a hash array and added to the pattern dictionary database 930.

The methods described herein are generally embodied in computer programs. The programming language and computer hardware on which the methods are performed is not critical to the present invention. It will be appreciated by those skilled in the art that such programs are embodied on computer readable media, such as optical or magnetic media, such as CD-ROMS, magnetic diskettes and the like. Such programs can also be distributed by downloading the programs over a digital data network.

The systems and methods described herein provided for the automatic generation of dictionary entries based on an analysis of full text materials. When a corpus of domain specific full text materials are provided, a domain specific dictionary, such as a dictionary of technical terms, can be generated. The dictionary can be dynamic, with new entries being added when additional full text materials are input to the system to extract <term, definition> pairs.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A method for automatically generating a dictionary based on a corpus of full text articles, comprising:

applying linguistic pattern analysis to the sentences in the corpus to extract <term, definition> pairs and identify sentences with candidate complex <term, definition> pairs;

applying grammar analysis to the sentences with candidate complex <term, definition> pairs to extract <term, definition> pairs;

storing the extracted <term, definition> pairs in a dictionary database;

wherein the linguistic pattern analysis further comprises identifying sentences including text markers, and wherein the sentences including text markers are subjected to filtering to remove sentences not likely to include <term, definition> pairs, and wherein the filtering includes rules selected from the group including sentences with conjunctions at the beginning of a text marker, sentences having phrases indicative of explanation, and sentences having patterns indicative of enumeration.

2. The method for automatically generating a dictionary according to claim 1, wherein pattern analysis of sentences including text markers identifies noun phrase patterns of the form <Noun Phrase 1> text marker <Noun Phrase 2> as <term, definition> pairs.

3. The method for automatically generating a dictionary according to claim 2, wherein the frequencies of Noun Phrase 1 and Noun Phrase 2 are determined and the noun phrase having the higher frequency is considered the term and the other noun phrase is considered the definition for the term.

4. The method for automatically generating a dictionary according to claim 2, wherein sentences with text markers having complex linguistic patterns are identified as sentences including candidate complex <term, definition> pairs.

5. The method for automatically generating a dictionary according to claim 1, wherein sentences which do not include text markers, but include complex linguistic patterns are identified as including candidate complex <term, definition> pairs.

6. The method for automatically generating a dictionary according to claim 1, wherein grammar analysis of sentences including candidate complex <term, definition> pairs includes at least one of processing of sentences exhibiting apposition and processing of sentences in the form <term> is <definition>.

7. The method for automatically generating a dictionary according to claim 1, further comprising a bootstrap process which applies the <term, definition> pairs in the dictionary to the corpus to extract additional <term, definition> pairs.

8. A method for automatically generating a dictionary based on a corpus of full text articles, comprising:

applying linguistic pattern analysis to the sentences in the corpus to extract <term, definition> pairs and identify sentences with candidate complex <term, definition> pairs;

applying grammar analysis to the sentences with candidate complex <term, definition> pairs to extract <term, definition> pairs;

storing the extracted <term, definition> pairs in a dictionary database;

wherein the linguistic pattern analysis further comprises identifying sentences including cue phrases and wherein sentences including predetermined cue phrases are parsed to identify left hand side context and right hand side context of the cue phrase, and wherein if the left hand side and right hand side contexts are noun phrases, then the left hand side context is considered the term and the right hand side context is considered the definition for the term.

9. A method for automatically generating a dictionary based on a corpus of full text articles, comprising:

applying linguistic pattern analysis to the sentences in the corpus to extract <term, definition> pairs and identify sentences with candidate complex <term, definition> pairs;

applying grammar analysis to the sentences with candidate complex <term, definition> pairs to extract <term, definition> pairs;

storing the extracted <term, definition> pairs in a dictionary database;

wherein grammar analysis of sentences including candidate complex <term, definition> pairs includes processing of sentences exhibiting apposition wherein apposition processing includes:

identifying the left conjunction and right conjunction in the sentence; and if the right conjunction is a noun phrase and does not include a further conjunction, the right conjunction is considered the definition and the left conjunction is considered the term of a <term, definition> pair.

10. A method for automatically generating a dictionary based on a corpus of full text articles, comprising:

applying linguistic pattern analysis to the sentences in the corpus to extract <term, definition> pairs and identify sentences with candidate complex <term, definition> pairs;

applying grammar analysis to the sentences with candidate complex <term, definition> pairs to extract <term, definition> pairs;

storing the extracted <term, definition> pairs in a dictionary database;

wherein grammar analysis of sentences including candidate complex <term, definition> pairs includes processing of sentences in the form <term> is <definition> and wherein sentences of the form <term> is <definition> are further processed by the steps:

if the root of the sentence is a present tense for of the verb "to be" and the subject of the sentence is a noun then evaluate the predicate of the sentence;

evaluate daughters of subject to determine if daughters are left conjunctions and right conjunctions;

if daughters are not in the form of left conjunctive and right conjunctive, evaluate predicate, and if the predicate of the sentence is a noun, the subject is considered the term and a subtree rooted at the predicate is considered the definition of the <term, definition> pair.

11. The method for automatically generating a dictionary according to claim 10, wherein if the daughters are in the form of left conjunction and right conjunction, determine if daughters are both nouns;
  if daughters are both nouns, assign left conjunctive and right conjunctive as additional terms; and
  if predicate is a noun, then consider subtree rooted at the predicate as the definition for <term, definition> pairs for both left conjunction and right conjunction terms.

12. A system for automatically generating a dictionary from full text articles comprising:
  a computer readable corpus having a plurality of documents therein;
  a computer readable dictionary database;
  a pattern processing module for extracting <term, definition> pairs from the corpus and storing the <term, definition> pairs in the dictionary database;
  a grammar processing module for extracting <term, definition> pairs from the corpus and storing the <term, definition> pairs in the dictionary database; and
  a routing processing module which routes sentences in the corpus to the pattern processing module;
  wherein the pattern processing module further comprises a filtering module to remove sentences not likely to include <term, definition> pairs and wherein the filtering module applies at least one rule selected from the group including sentences with conjunctions at the beginning of a text marker, sentences having phrases indicative of explanation, and sentences having patterns indicative of enumeration.

13. The system for automatically generating a dictionary according to claim 12, further comprising a bootstrap processing module, the bootstrap processing module applying entries in the dictionary database to the corpus and extracting and storing additional <term, definition> pairs.

14. The system for automatically generating a dictionary according to claim 12 wherein:
  the routing processing module tags sentences which may include <term, definition> pairs and routes all tagged sentences to the pattern processing module;
  the pattern processing module performs the additional operation of identifying sentences which include candidate complex <term, definition> pairs; and
  the grammar processing module receives the candidate complex <term, definition> pairs from the pattern processing module.

15. The system for automatically generating a dictionary according to claim 12, wherein the pattern processing module identifies sentences including at least one of text markers and cue phrases as <term, definition> pairs.

16. The system for automatically generating a dictionary according to claim 15, wherein the pattern processing module processes sentences including text markers by identifying noun phrase patterns of the form <Noun Phrase 1> text marker <Noun Phrase 2> as <term, definition> pairs.

17. The system for automatically generating a dictionary according to claim 16, wherein the pattern processing module determines the frequency of occurrence of each of Noun Phrase 1 and Noun Phrase 2 and assigns the noun phrase having the higher frequency as the term and the other noun phrase as the definition for the term.

18. The system for automatically generating a dictionary according to claim 16, wherein the pattern processing module identifies sentences with text markers having complex linguistic patterns as sentences including candidate complex <term, definition> pairs.

19. The system for automatically generating a dictionary according to claim 15, wherein the pattern processing module identifies sentences which do not include text markers, but include complex linguistic patterns as including candidate complex <term, definition> pairs.

20. The system for automatically generating a dictionary according to claim 12, wherein the grammar processing module extracts <term, definition> pairs from sentences including at least one of sentences exhibiting apposition and sentences in the form <term> is <definition>.

21. A system for automatically generating a dictionary from full text articles comprising:
  a computer readable corpus having a plurality of documents therein;
  a computer readable dictionary database;
  a pattern processing module for extracting <term, definition> pairs from the corpus and storing the <term, definition> pairs in the dictionary database;
  a grammar processing module for extracting <term, definition> pairs from the corpus and storing the <term, definition> pairs in the dictionary database; and
  a routing processing module which routes sentences in the corpus to the pattern processing module,
  wherein the pattern processing module identifies sentences including cue phrases as <term, definition> pairs, and wherein the pattern processing module parses sentences including predetermined cue phrases to identify left hand side context and right hand side context of the cue phrase, and wherein if the left hand side and right hand side contexts are noun phrases, then the left hand side context is assigned as the term and the right hand side context is assigned as the definition for the term.

22. Computer readable media encoded with instructions to direct a computer system to generate a dictionary based on a corpus of full text articles, comprising the steps of:
  applying linguistic pattern analysis to sentences in a corpus to extract <term, definition> pairs and identify sentences with candidate complex <term, definition> pairs;
  applying grammar analysis to the sentences with candidate complex <term, definition> pairs to extract <term, definition> pairs; and
  storing the extracted <term, definition> pairs in a dictionary database;
  wherein the linguistic pattern analysis further comprises identifying sentences including text markers and, wherein the sentences including text markers are subjected to filtering to remove sentences not likely to include <term, definition> pairs, and wherein the filtering includes rules selected from the group including sentences with conjunctions at the beginning of a text marker, sentences having phrases indicative of explanation, and sentences having patterns indicative of enumeration.

* * * * *

UNITED STATES PATENT AND TRADEMARK OFFICE
CERTIFICATE OF CORRECTION

| | | |
|---|---|---|
| PATENT NO. | : 7,254,530 B2 | Page 1 of 1 |
| APPLICATION NO. | : 10/398535 | |
| DATED | : August 7, 2007 | |
| INVENTOR(S) | : Judith L. Klavans and Smaranda Muresan | |

It is certified that error appears in the above-identified patent and that said Letters Patent is hereby corrected as shown below:

Col. 1, line 50, "domains based on an analysis of fall text articles." should be -- domains based on an analysis of full text articles. --

Col. 1, line 57, "corpus of fall text articles is provided." should be -- corpus of full text articles is provided. --

Col. 7, line 42-43, "<l,T,m,Def,r> is recorded that keeps left(l), the middle (m) and the right(r) context inside the sentence (step 825)." should be -- <l,T,m,Def,r> is recorded that keeps left(l), the middle(m) and the right(r) context inside the sentence (step 825). --

Col. 8, line 3, "=,R*Log2(F), where F is the number of unique good tuples" should be -- =R*Log2(F), where F is the number of unique good tuples --

Col. 10, line 53, "considered a definition for the term (step 1190). The <ten," should be -- considered a definition for the term (step 1190). The <term, --

Col. 10, line 65, "The systems and methods described herein provided for" should be -- The systems and methods described herein provide for --

Col. 14, line 53, "identifying sentences including text markers and," should be -- identifying sentences including text markers, and --

Signed and Sealed this

Eighteenth Day of May, 2010

David J. Kappos
*Director of the United States Patent and Trademark Office*